United States Patent [19]

Araki et al.

[11] Patent Number: 5,307,446
[45] Date of Patent: Apr. 26, 1994

[54] KNOWLEDGE ACQUISITION SYSTEM

[75] Inventors: Dai Araki, Yokohama; Shoichi Kojima, Fujisawa, both of Japan

[73] Assignee: Kabushiki Kaisha Toshiba, Kawasaki, Japan

[21] Appl. No.: 733,820

[22] Filed: Jul. 22, 1991

[30] Foreign Application Priority Data

Jul. 23, 1990 [JP] Japan .................................. 2-193160

[51] Int. Cl.$^5$ ............................................. G06F 15/00
[52] U.S. Cl. ........................................ 395/77; 395/75
[58] Field of Search ........................ 395/51, 75, 76, 77

[56] References Cited

U.S. PATENT DOCUMENTS 4,866,635  9/1989  Kahn et al. .......................... 364/513
5,167,012 11/1992  Hayes et al. ........................... 395/76

OTHER PUBLICATIONS

Barr et al., The Handbook of Artificial Intelligence vol. II, Addison Wesley, 1982, 87–101.
Kahn et al., "Strategies for Knowledge Acquisition", IEEE Trans. on Pattern Analysis and Machine Intelligence, Sep. 1985, 511–522.
Gruber et al., "The Design of an Automated Assistant for Acquiring Strategic Knowledge", Heuristics–The Jou. of Knowledge Engineering, Jun. 1989, 64–67.
Arif Ghafoor et al., "A Design Methodology For Expert Systems for Diagnostic and Repair," Conference Proceedings Of The Eighth Annual International Phoenix Conference On Computers And Communications–Mar. 22–24, 1989, Scottsdale, Arizona US (pp. 550–554).
Jean-Louis Lauriere, "Knowledge Representation and Use Expert Systems," Technology And Science of Informatics, vol. 1, No. 1, 1983, Oxford GB (pp. 9–26).
Luc Steels, "Second Generation Expert Systems," Future Generations Computer Systems, vol. 1, No. 4, Jun. 1985, Amsterdam NL (pp. 213–221).

Primary Examiner—Michael R. Fleming
Assistant Examiner—Robert W. Downs
Attorney, Agent, or Firm—Finnegan, Henderson, Farabow, Garrett & Dunner

[57] ABSTRACT

Disclosed herein is a practical knowledge acquisition system, in which, when a diagnosis is made using a knowledge base in the form of an associative network turns out to be erroneous, the network is analyzed backwards from the node representing a desired solution, thereby detecting a node where the backward analysis route joins that analysis route in the network which has resulted in the erroneous diagnosis. The node where the two analysis routes join is identified as one possibility where an error has occurred in the diagnosis. The diagnostic knowledge applied at this node is seen as an candidate to be modified many modification plans for the incorrect knowledge is proposed, the diagnostic knowledge base can be modified with high efficiency.

4 Claims, 5 Drawing Sheets

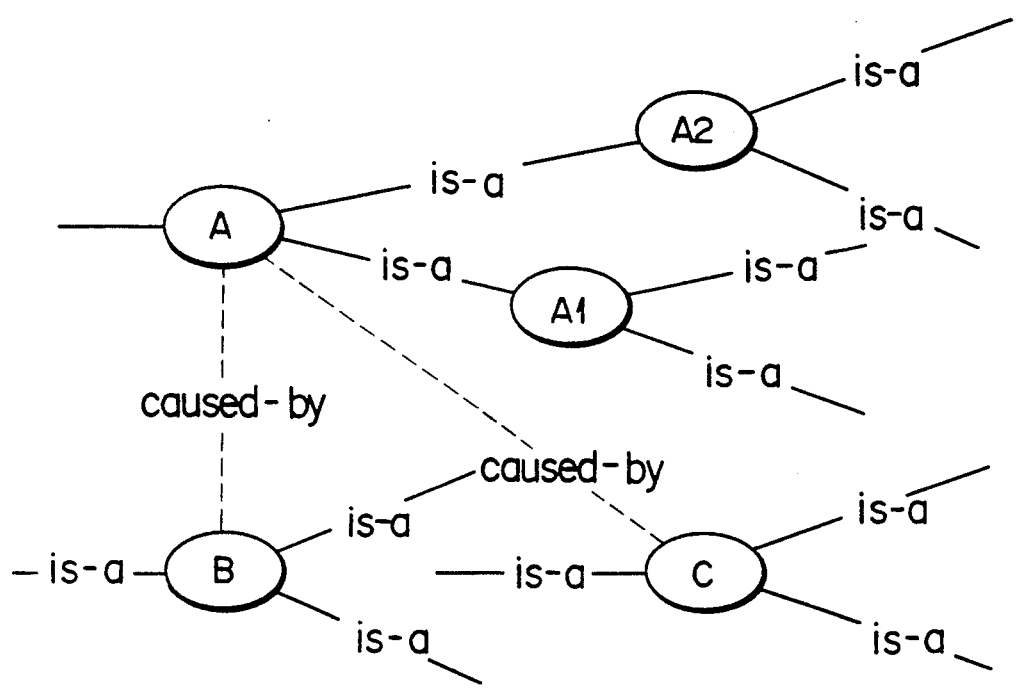
F I G. 2

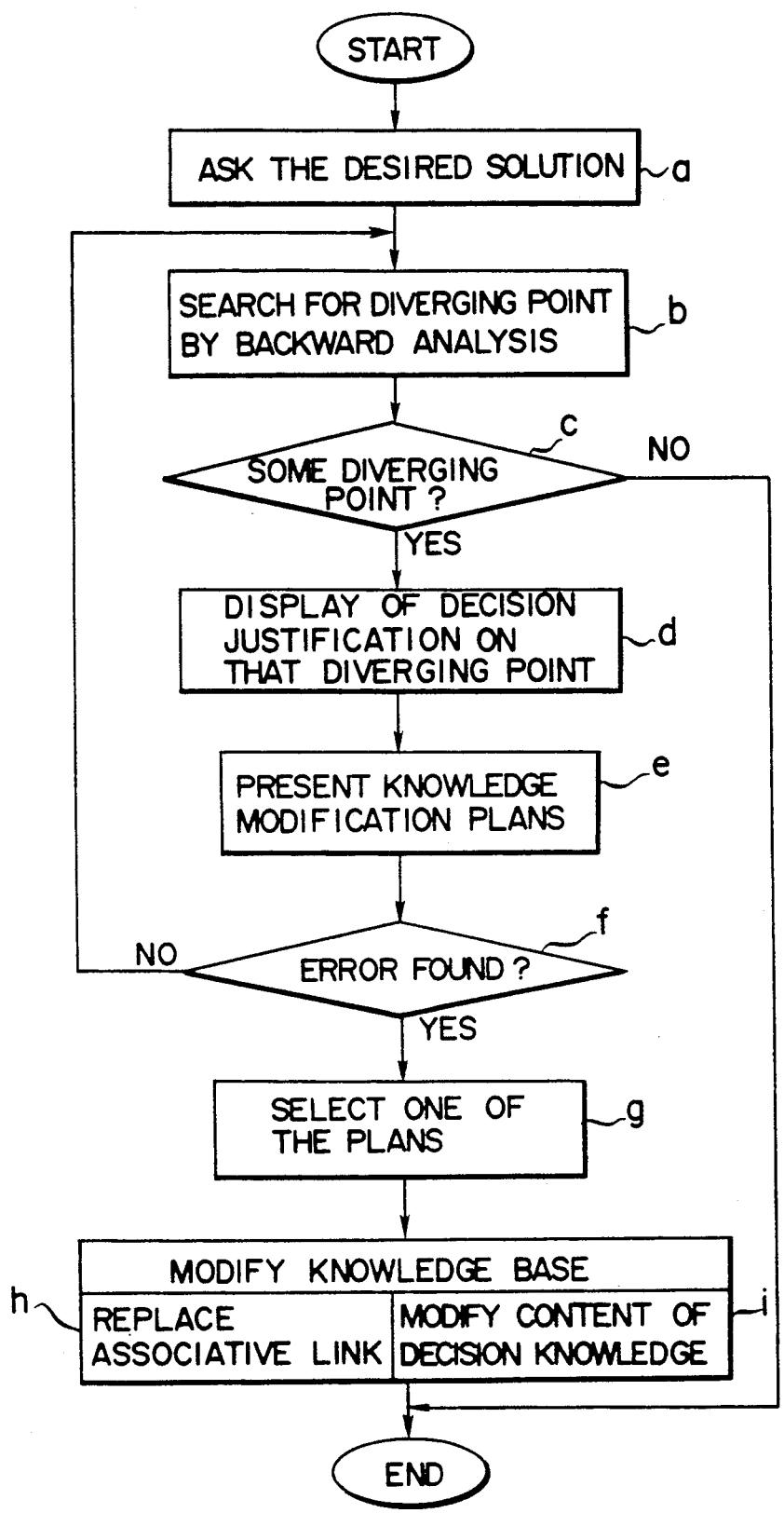
F I G. 3

KNOWLEDGE ACQUISITION SYSTEM

BACKGROUND OF THE INVENTION

1. Field of the Invention

The present invention relates to a knowledge acquisition system for efficiently modifying the knowledge base prepared in developing a diagnostic expert system, by using the knowledge acquired in the actual cases diagnosed by means of the diagnostic expert system.

2. Description of the Related Art

Recently, thanks to the advance in computer technology, so-called expert systems have been developed and put to practical use, in which a computer performs part of the work only experts can accomplish. An expert system is developed and verified in the following process. First, a knowledge base is prepared by compiling a multitude of knowledge pieces which human experts have acquired through their experience. Next, a computer diagnoses several cases based on the knowledge base, and an expert diagnoses the same cases. Then, the computer diagnosis is compared with the diagnosis made by human expert, thereby finding differences between the diagnoses. Finally, the knowledge base is modified, thereby canceling the differences.

Hitherto, to collect pieces of knowledge which can be utilized to modify the knowledge base, a person known as "knowledge engineer" must interview human expert and acquire sufficient expert knowledge to modify the knowledge base.

To relieve the knowledge engineer from the tedious task of acquiring a multitude of expert knowledge, it is demanded that a automatic knowledge acquisition system be developed, in which a computer can acquire expert knowledge with high efficiency. To meet this demand, various knowledge acquisition systems have been and are being developed. Knowledge-acquiring techniques are disclosed in Sandra Marcus, *Automating Knowledge Acquisition for Expert Systems*, Kluwer Academic Publishers, 1988, pp. 37-80.

The knowledge base of a diagnostic expert system includes an associative network defining the relationship among events which may occur in an object of diagnosis. In the expert system of this type, the associative network is traced in the forward direction from the symptom event (e.g., an undesirable one) detected first, thereby obtaining a causal event for the symptom event as the diagnostic result.

In the conventional system, if an error is found in the diagnostic result, diagnostic knowledge is modified in the following way. First, all analysis routes traced to obtain the erroneous result of analysis are presented to a human expert. Then, the human expert points out where an error has occurred in the presented analysis route. Finally, the knowledge applied in obtaining the erroneous result of analysis is modified.

In this method, what serves to find a defect in the knowledge base is nothing but the data about the analysis route in which the error has occurred. In other words, the expert cannot help but rely on this data in order to determine where in that route the error has taken place. Therefore, with the conventional system, it is difficult, even for a human expert, to find a defect in the knowledge base and, hence, to modify the knowledge base to remove this defect.

SUMMARY OF THE INVENTION

The object of the present invention is to provide a knowledge acquisition system in which a defective part, if any, of a knowledge base can easily be detected from the diagnostic result obtained by using the knowledge base available in the form of an associative network, and the defective part, thus detected, can easily be modified.

In a first aspect of the invention, there is provided a knowledge acquisition apparatus for use in a diagnostic expert system using, as part of a knowledge base, an associative network consisting of nodes representing events and links each showing the relation between two nodes, said knowledge acquisition system comprising:

means for analyzing the associative network from the node presenting a desired solution in a first direction opposite to a second direction in which the network is traced in the expert system, when the diagnostic result obtained from the knowledge base in the expert system is not desirable;

means for finding the diverging points of the associative network at which a first-direction analyzing route joints a second-direction analyzing route along which the diagnostic result has been obtained in the expert system;

means for showing the decision justification applied at one of the diverging points in the expert system, and presenting some knowledge modification plans to correct the diagnostic trace as the direction toward the desired solution;

means for confirming the rightness of decision justification, and for selecting one of the knowledge modification plans when the human expert determines that it is necessary to modify the knowledge applied at the diverging point.

In a second aspect of the invention, there is provided a knowledge acquisition apparatus comprising:

an interview manager unit functioning as an interface between the apparatus and a human expert, for generating questions to the human expert;

a backward analysis unit for analyzing an associative network backwards, thereby to detect a diverging point at which a analysis route resulting in an erroneous diagnosis joins an analysis route resulting in a correct diagnosis supplied from the interview manager unit;

a modification plan generation unit for generating a modification plan for modifying knowledge applied to detect the diverging point and for supplying the modification plan to the interview manager unit;

a diagnostic knowledge base having an associative network and the multitude of decision knowledge pieces applicable to determine which direction to be traced in the course of diagnosis;

a knowledge modification unit for analyzing modification instructions made by the human expert, and modifying the diagnostic knowledge base;

a diagnosis trace containing data representing the diagnostic trace hitherto made; and a knowledge modification method storage storing various modification plans for modifying the diagnostic knowledge base.

In a third aspect of the invention. there is provided a method of acquiring knowledge. comprising the steps of:

asking human experts a desired solution, when an incorrect diagnostic answer has been obtained by a diagnostic expert system;

analyzing the associative network from a node presenting a desired solution in a first direction opposite to a second direction in which the network is traced in the expert system, and detecting a diverging point at which a first-direction analyzing route joints a second-direction analyzing route along which the incorrect diagnosis has been obtained in the expert system;

showing the decision justification why such direction was selected at one of the diverging points;

presenting some possible knowledge modification plans to correct the diagnostic trace as the direction toward the desired solution mode;

asking a human expert whether the decision justification is correct or not;

making a human expert choose one of the knowledge modification plans when the human expert find it necessary to modify the knowledge applied at the diverging is point; and modifying the associative links or the contents of decision knowledge in accordance with the chosen modification plane.

In the present invention, when any diagnosis made by using the associative network stored in the diagnostic knowledge base of the diagnostic expert system turns out to be erroneous, the network is analyzed backwards from the node representing a desired solution, thereby detecting all nodes where the backward analysis route joins that analysis route in the network which has resulted in the erroneous diagnosis. Each node where the two analysis routes join is identified as one possibility where a decision error has occurred in the diagnosis. The diagnostic knowledge applied at this node is seen as a candidate to be modified. Since many modification plans for the incorrect knowledge are proposed, the diagnostic knowledge base can be modified with high efficiency. In view of this, the knowledge acquisition system of the invention has great practical value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a diagram showing an associative network which is part of a knowledge base;

FIG. 3 is a flow chart representing the procedure of acquiring knowledge in the system shown in FIG. 1;

DETAILED DESCRIPTION OF THE PREFERRED EMBODIMENTS

A knowledge acquiring system of the invention, which is designed for use in a diagnostic expert system, will now be described in detail, with reference to the accompanying drawings.

Figure 1:
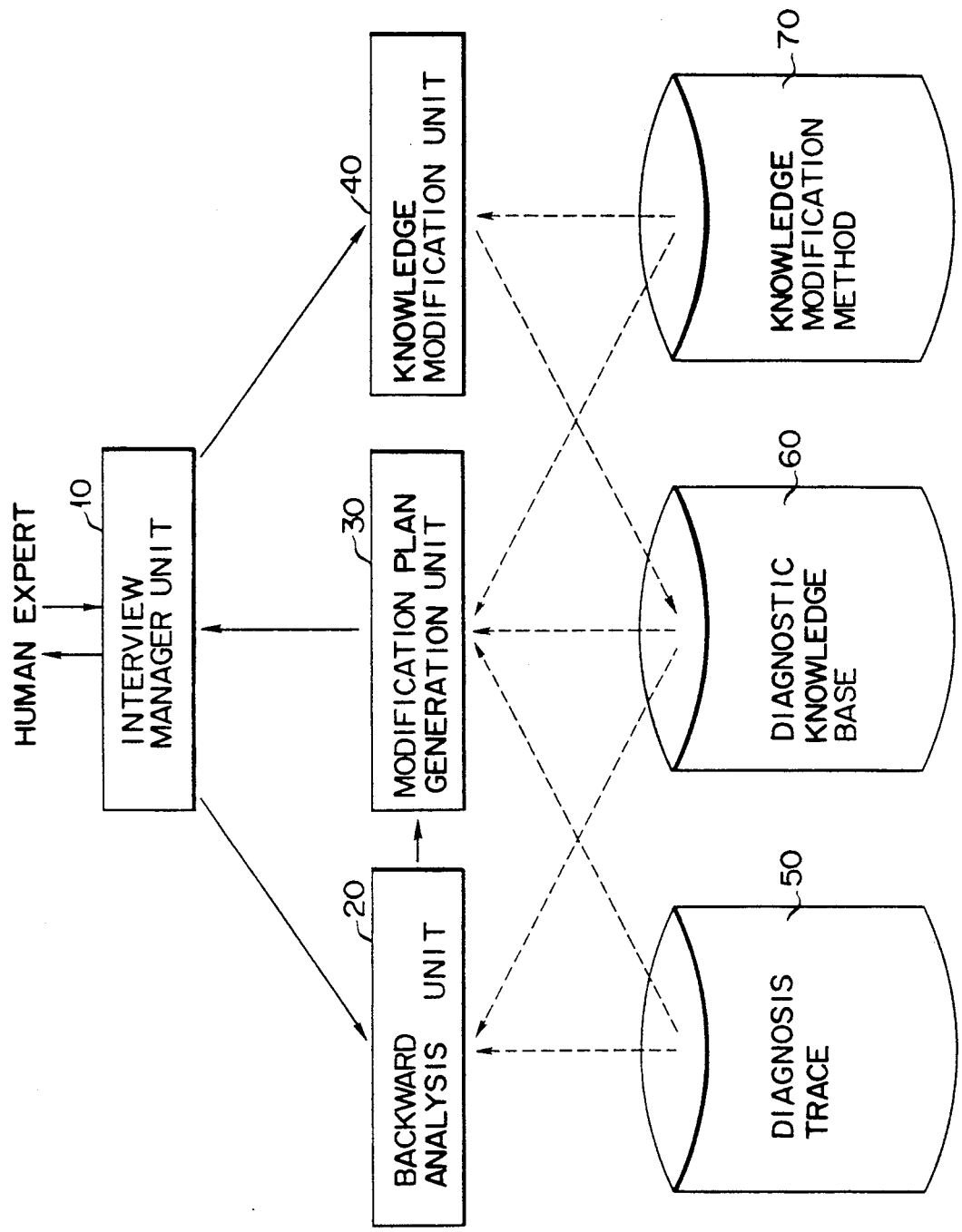
FIG. 1 is a block diagram schematically showing a knowledge acquisition system according to the present invention.

FIG. 1 is a block diagram schematically showing the knowledge acquiring system. As is evident from FIG. 1, the system comprises an interview manager unit 10, a backward analysis unit 20, a modification plan generation unit 30, a knowledge modification unit 40, a diagnosis trace 50, a diagnostic knowledge base 60, and an knowledge modification method 70.

The interview manager unit 10 is an interface between a human expert, on the one hand, and the units 20, 30 and 40, on the other. The unit 10 formulates various questions to be given to the human expert. The backward analysis unit 20 analyzes the associative network stored in the diagnostic knowledge base 60. The modification plan generation unit 30 generates some knowledge modification methods with applying the knowledge modification method 70, which makes correct the diagnostic decision toward the desired direction at the diverging point which the unit 20 has found. The knowledge modification unit 40 analyzes the answer of the human expert, detects a defective part, if any, of the diagnostic knowledge base 60, and modifies the defect part of the base 60. The units 10, 20, 30, and 40 operate in concert to acquire pieces of diagnostic knowledge and modify, if found necessary, some of the knowledge pieces forming the diagnostic knowledge base 60.

The diagnostic knowledge base 60, thus enriched and modified, can be employed directly in a diagnostic expert system. The knowledge base 60 contains the data representing the established relations (i.e., links) among diagnosed events. This data, used as part of the knowledge base applied to the diagnostic expert system, is generally known as "associative network."

As is shown in FIG. 2, the associative network comprises two types of links, "[is-a]" links and "[caused-by]" links. Each "[is-a]" link indicates the abstract-concrete relation between two events, whereas each "[caused-by]" link represents the cause-effect relation between two events. More specifically, an "[is-a]" link connecting an abstract event A and a concrete event A1 indicates that the event A is more abstract than the event A1, and another "[is-a]" link connecting the abstract event A and a concrete event A2 means that the event A is more abstract than the event A2. Further, a "[caused-by]" link connecting event A and event B means that the event A causes the event B or vice versa, and "[caused-by]" link connecting the event A and an event C means that the event A causes the event C or vice versa. The associative network is analyzed, link by link, whereby a given event is diagnosed.

Now the knowledge acquisition system shown in FIG. 1 work will now be explained, with reference to FIGS. 3, FIGS. 4A and 4B, and FIG. 5.

Figure 4A:
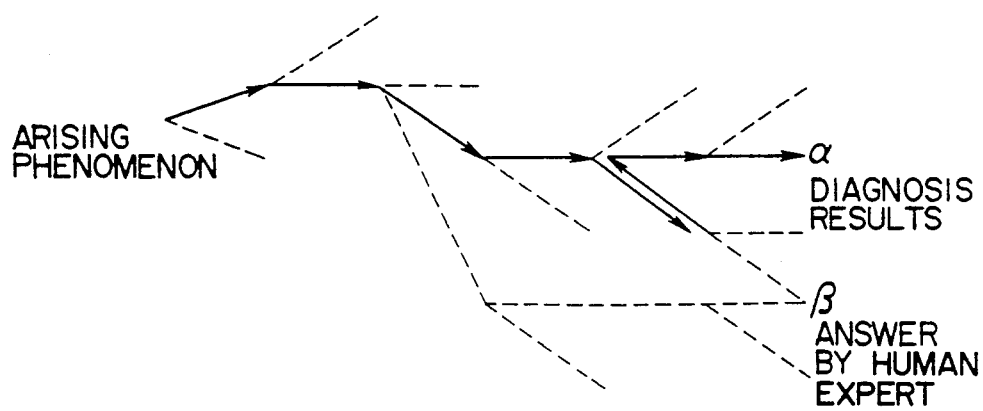
FIGS. 4A and 4B are graphic representations of a forward and a backward analysis route in the associative network shown in FIG. 2, respectively.
Figure 4B:
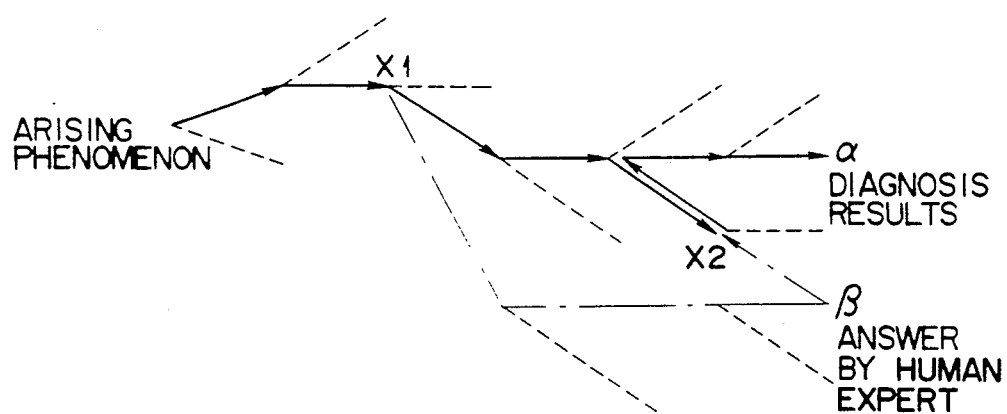
Figure 5:
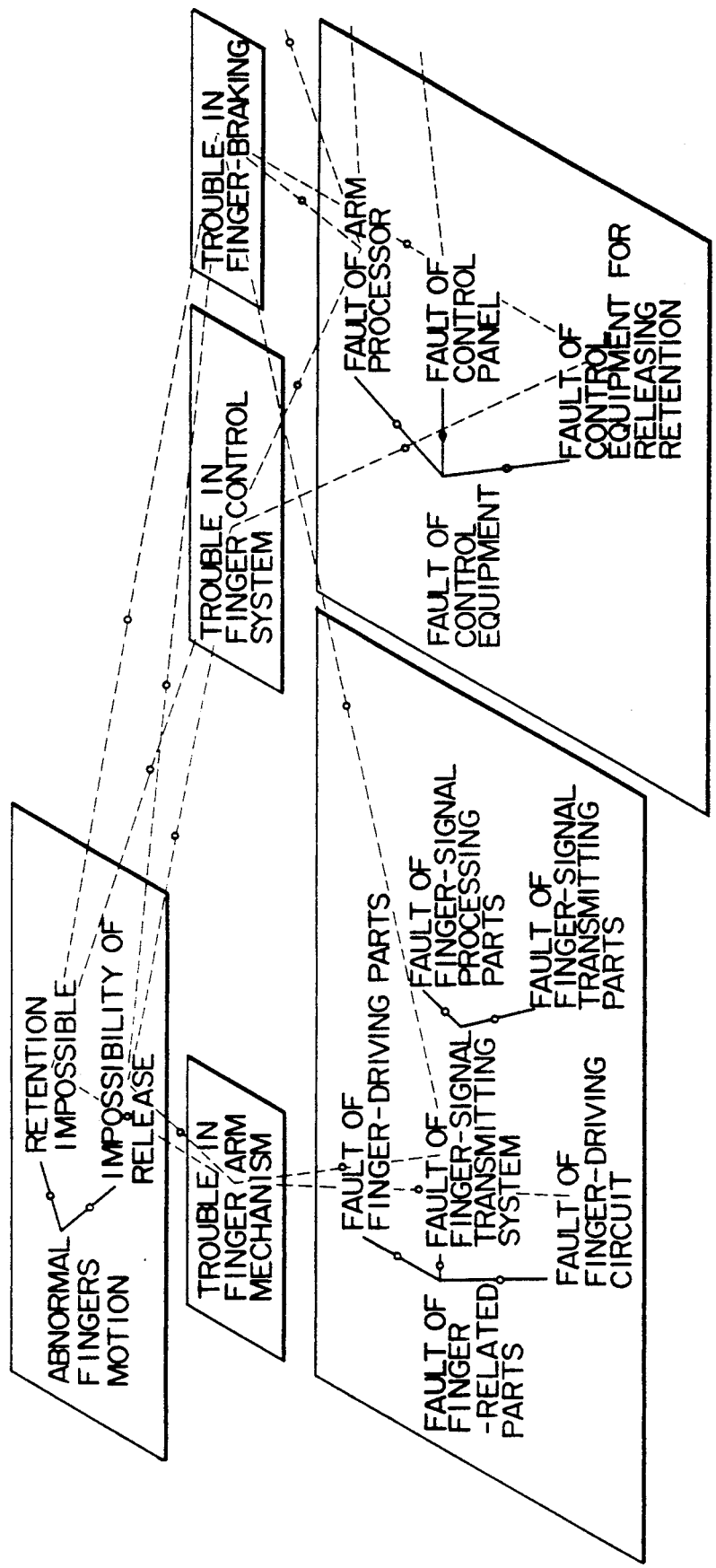
FIG. 5 is a diagram showing an associative network applied in the system of FIG. 1 in order to analyze the malfunction of a robot.

FIG. 3 is a flow chart representing the procedure of interviewing the human expert and also that of modifying the diagnostic knowledge base 60. FIGS. 4A and 4B illustrate a forward and a backward analysis route in the associative network (FIG. 2), respectively. FIG. 5 schematically shows an associative network applied in the system of FIG. 1 in order to analyze the malfunction of a robot.

The diagnostic expert system is operated, using the associative network stored in the diagnostic knowledge base 60. When the expert system concludes a diagnosis answer different from a desired solution, the knowledge acquiring system (FIG. 1) goes into operation. It asks the human expert several questions, gets the expert's answers, analyzes the answers, and modifies a part of the knowledge base 60, thereby acquiring new knowledge. It will be explained, in detail, how the knowledge acquisition system operates.

For example, when the solution provided by the expert system is node α (FIG. 4A) indicating the malfunction of the arm processor of the robot, not node β (FIG. 4A) which is the desired solution and which indicates the malfunction of the hold-release controller of the robot in the associative network (FIG. 4A), the expert systems determines that this erroneous solution results from some defective part of the diagnostic knowledge base 60. Then, knowledge acquiring system starts operating to modify the defective part of the knowledge base 60, as will be explained with reference to the flow chart of FIG. 3.

First, in step a, interview manager unit 10 is activated, thus asking human expert what is the correct answer node in the previous diagnosis.

Then, in step b, the backward analysis unit 20 is activated, thus analyzing the associative network (FIG. 4B) backwards, from the node β, the desired solution. Then, in step c, the unit 20 finds a first diverging point x1 where a backward analysis route extending from the node β joins the forward analysis route extending to the node α, i.e., the erroneous solution. The point x1 indicates a trouble in the brake system for the robot's fingers.

Next, in step d, the modification plan generation unit 30 is activated, making the decision justification applied at the diverging point x1, and the interview manager unit 10 displays the decision justification.

Next, in step e, the modification plan generation unit 30 generates some knowledge modification plans to correct the diagnostic trace at the diverging point x1 as the direction toward the desired solution point β, and the interview manager unit 10 displays the generated modification plans.

Next, in step f, the interview manager unit 10 confirms the rightness of decision justification applied at the diverging point x1.

More specifically, steps d, e and f are performed for the diverging point x1 which indicates a trouble in the brake system for the robot's fingers. The expert finds no errors at the point x1, operator inputs to the unit 10 an answer that there are no errors at the point x1. Then, steps d, e and f are carried out for the point x2 which indicates the opening of the robot's fingers. The human expert detects an error at the point x2, operator inputs to the unit 10 an answer that an error has occurred at the diverging point x2.

In step g the selected modification plan is input to the knowledge modification unit 40 in response to the expert's answer that an error has occurred at the point x2. The unit 40 is activated and analyzes the selected modification plan. Next, the unit 40 replaces an associative link with a more appropriate one in step h, or alters the content of decision knowledge in step i, whereby the associative network or the decision knowledge in the knowledge base 60 is modified and, hence, new piece of knowledge is acquired.

As can be understood from the above, when any diagnosis made by using the associative network stored in the diagnostic knowledge base 60 in the diagnostic expert system turns out to be erroneous, the network is analyzed backwards from the node representing a correct solution, thereby detecting a node where the backward analysis route joins that analysis route in the network which has resulted in the erroneous diagnosis. The analysis route resulting in the erroneous diagnosis is not presented to the human expert. The node where the two analysis routes join is identified as one possibility where an error has occurred in the previous diagnosis. The decision justification applied at the node is displayed, and some knowledge modification plans to correct the diagnostic trace at the node as the direction toward the desired solution are proposed. A question is asked to the human expert, whether the diagnostic knowledge applied at this node is correct or not. If the expert answers that the knowledge is incorrect, a question is asking to the human expert, which modification plan he accepts, and the knowledge is modified, or a link in the associative network is replaced by an appropriate one. As a result, the associative network is modified or enriched with high efficiency.

The present invention is not limited to the embodiment shown in FIG. 1. For example, the associative network can be analyzed forwards if the knowledge acquisition system is designed for use in a diagnostic expert system, wherein analysis proceeds backwards. Moreover, in the backward analysis described above with reference to FIGS. 4A and 4B, whether or not an error has occurred at each diverging point can be determined, either immediately after the point is detected or after all diverging points are detected. Further, the question to the human expert can be of any type or form that is suitable. Other changes and modifications can be made, without departing from the scope of the present invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A knowledge acquisition apparatus for use in a diagnostic expert system using, as part of a knowledge base, an associative network consisting of nodes representing events and links each showing the relation between two nodes, said knowledge acquisition apparatus comprising:

means for analyzing the associative network from a node presenting a desired solution in a fist direction opposite to a second direction in which the network is analyzed in said diagnostic expert system, when a diagnosis obtained from the knowledge base in said diagnostic expert system is not desirable;

means for retrieving the diverging points of the associative network at which a first-direction analyzing route meets a second-direction analyzing route along which a diagnostic result has been obtained in said diagnostic expert system;

means for showing a decision justification applied at one of the diverging points in said diagnostic expert system, and for presenting a knowledge modification plan to correct the diagnostic trace as the direction toward the desired solution;

means for confirming the correctness of the decision justification, and for selecting the knowledge modification plan if it is necessary to modify a knowledge applied at the diverging point; and means for displaying the associative network.

2. A knowledge acquisition apparatus for use in a diagnostic expert system using an associative network consisting of nodes representing events and links each showing the relation between two nodes, said knowledge acquisition apparatus comprising:

a display unit for displaying the associative network;

an interview manager unit for interfacing between said knowledge acquisition apparatus and a human expert, and for generating on the display unit questions to the human expert;

a backward analysis unit for analyzing the associative network backwards, and for detecting a diverging point at which a first analysis route resulting in an erroneous diagnosis joins a second analysis route resulting in a correct diagnosis supplied from said interview manager unit;

a modification plan generation unit for generating a modification plan for modifying knowledge applied to detect the diverging point and for supplying the modification plan to the interview manager unit;

a diagnostic knowledge base having the associative network and a multitude of decision knowledge pieces applicable to determine which direction to be traced in the course of diagnosis;

a knowledge modification unit for analyzing modification instructions made by the human expert, and for modifying the diagnostic knowledge base;

a diagnosis trace containing data representing a diagnostic trace; and a knowledge modification plan storage storing various modification plans for modifying the diagnostic knowledge base.

3. A method of acquiring knowledge in a diagnostic expert system using, as part of a knowledge base, an associative network consisting of nodes representing events and links each showing the relation between two nodes, said method comprising the steps of:

asking human experts a desired solution, when an incorrect diagnostic answer has been obtained by said diagnostic expert system;

analyzing the associative network from a node presenting a desired solution in a first direction opposite to a second direction in which the network is traced in said diagnostic expert system, and retrieving a diverging point at which a first-direction analyzing route meets a second-direction analyzing route along which the incorrect diagnosis has been obtained in said diagnostic expert system;

showing a decision justification why such direction was selected at the diverging point;

proposing a knowledge modification plan to correct a diagnostic trace as the direction toward the node presenting the desired solution;

asking a human expert whether the decision justification is correct or not;

selecting the knowledge modification plan if it is necessary to modify a knowledge applied at the diverging point;

modifying one of the associative links and the contents of decision knowledge in accordance with the selected modification plan; and displaying the associative network.

4. The method according to claim 3, wherein said step of modifying one of the associative links includes the substep of replacing an associative link with a new one in accordance with the selected modification plan.

* * * * *